May 18, 1948.  R. J. MILLER  2,441,715
SMOKING PIPE
Filed May 8, 1942
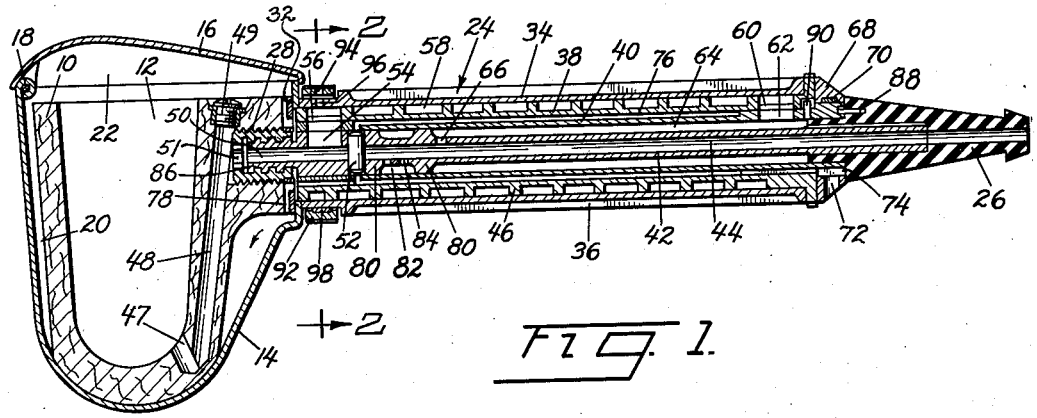
Fig. 1.
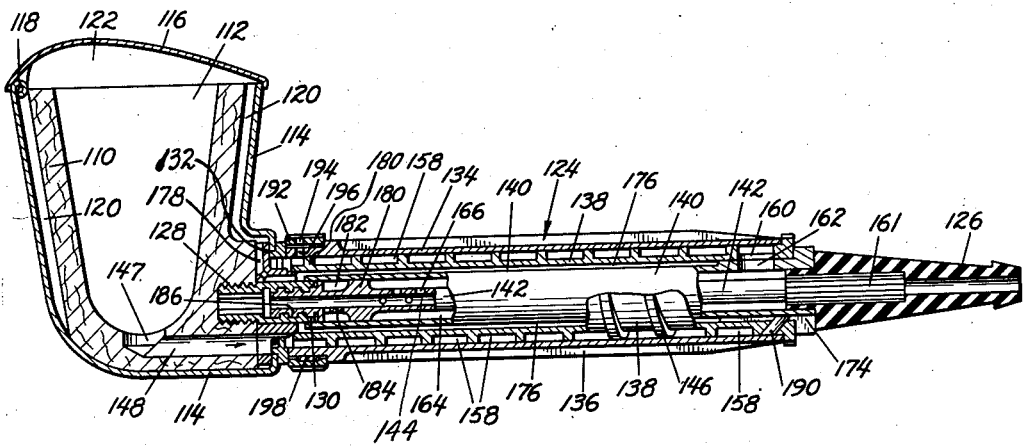
Fig. 4.
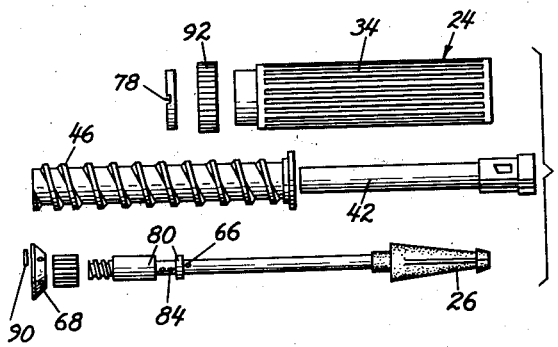
Fig. 2.
Fig. 3.
INVENTOR.
RAYMOND J. MILLER
BY
ATTORNEY Patented May 18, 1948

2,441,715

UNITED STATES PATENT OFFICE 2,441,715

SMOKING PIPE

Raymond J. Miller, Detroit, Mich.

Application May 8, 1942, Serial No. 442,168

7 Claims. (Cl. 131—198)

This invention relates to smoking pipes and more particularly to a so-called storm pipe having a combustion chamber substantially closed to the atmosphere surrounding the bowl and including means for cooling and preventing contamination of the smoke.

Previous attempts have been made by others to cool the smoke by providing a tortuous smoke conducting passage in a storm pipe. These prior attempts have not proved satisfactory because insufficient heat radiating surfaces were provided, and no means were available to cool the heat radiating surfaces. In many storm pipe designs heretofore proposed, complicated structural details were provided which could not be economically manufactured and which obstructed the flow of smoke through the pipe to an undesirable extent.

An object of this invention is to provide a so-called storm pipe wherein the air for supporting combustion in the bowl of the pipe is passed longitudinally through the stem to preheat it before it is admitted to the combustion chamber and to cool the smoke passing from the bowl to the bit of the pipe.

A further object of this invention is to provide novel and improved means for cooling the smoke conducted through a pipe in such a manner that the smoke is brought into intimate contact with cooled heat radiating surfaces.

Another object of the invention resides in the provision of a smoker's pipe which may be readily cleaned by merely disassembling the pipe and wiping external surfaces which engage and clean the internal surfaces of the pipe during the process of disassembling it.

Yet another object is to provide a novel storm pipe wherein air for combustion is admitted through the stem of the pipe adjacent the bit and auxiliary air for diluting the smoke to any desired extent is admitted adjacent the bowl of the pipe.

A further object is to provide a storm pipe having a cover over the bowl of the pipe whereby all of the air for supporting combustion is admitted through the stem of the pipe adjacent the bit.

Another object is to provide a pipe wherein all of the air for supporting combustion is admitted through the stem of the pipe adjacent the bit and passes to the combustion chamber of the pipe through an annular chamber positioned concentrically inside of a smoke conducting passage for cooling the smoke.

Yet a still further object is to provide a smoker's pipe wherein the air for supporting combustion in the bowl of the pipe is admitted through the stem adjacent the bit and is passed longitudinally of the stem in such a manner as to be preheated before being admitted to the combustion chamber whereby the bowl of the pipe is maintained at a more even temperature and condensation of moisture in the air is absorbed in the stem of the pipe and is not admitted to the bowl of the pipe whereby tar and products of condensation are not deposited in the bowl of the pipe.

Another object is to provide a pipe wherein condensation in the bowl of the pipe is prevented by preheating the air admitted to the bowl to avoid subjecting the bowl to wide variations of temperature during operation.

A further object resides in the provision of a saliva trap in a storm pipe isolated from the path of smoke travel in such a manner that smoke is not contaminated thereby and the trapped saliva is isolated from the bowl of the pipe.

A still further object resides in the provision of a storm pipe having a novel cooling arrangement whereby smoke is conducted along a spiral passageway formed in the stem of a pipe between atmospheric air on the outside and the air to support combustion in the combustion chamber flowing through an annular chamber positioned adjacent the spiral passageway.

Another object is to provide readily adjustable means for varying the angular relation between the bowl and stem of a pipe to suit the taste of the individual smokers.

Other objects and advantages of this invention will be apparent from the following description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal sectional view of a so-called storm pipe embodying the present invention.

Fig. 2 is a sectional view taken substantially on the line 2—2 of Fig. 1, looking in the direction of the arrows.

Fig. 3 is an exploded view of the component elements of the stem of the pipe illustrated in Fig. 1.

Fig. 4 is a view similar to Fig. 1, illustrating a modified form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the embodiment of the invention illustrated in Fig. 1, it will be observed that a pipe of the so-called storm pipe class has a bowl 10 including a combustion chamber 12. The bowl 10 is positioned in a casing 14 having a cover 16 hinged thereto at 18. Free spaces 20 and 22 are provided between the bowl 10 and the casing 14, and between the bowl and the cover 16 respectively. The bowl 10 and casing 14 are connected to a stem 24 having a bit 26.

The bowl 10 is provided with a threaded portion 28 having internal threads and a radially extending collet or flange 32 clampingly engaged to casing 14. The stem 24 comprises an outer tubular shell 34 having longitudinally extending heat radiating flanges 36 carried thereby extending from the casing 14 to the bit 26. A plurality of concentrically disposed cylinders 38, 40 and 42 are positioned within the tubular shell 34. The inner cylinder 42 has a centrally disposed bore 44 communicating with the space within the bit 26.

The outer cylinder 38 is provided with a spiral flange 46 extending longitudinally of the stem 24. The ends of the flange 46 engage the inner surface of the tubular shell 34 in such a manner that as the cylinder 38 is moved longitudinally within the tubular shell 34 the ends of the spiral flange 46 contact the inner surface of the tubular shell 34 to exert a cleaning or scrubbing action thereon to thoroughly clean it.

The combustion chamber 12 is provided with a port 47 communicating with a generally downwardly extending port 48 closed by a plug 49. The port 48 communicates with an aperture 51 extending through the collet 28 to a passageway 50 formed in the inner cylinder 42 and separated from the bore 44 by means of a suitable plug 52 to divide the space within the inner cylinder 42 into longitudinally separated smoke conducting passages 50 and 44 communicating with the combustion chamber 12 and bit 26 respectively.

After passing through the passageway 50, smoke is directed through an aperture 54 communicating with an aperture 56 formed in the outer cylinder 38, whereupon communication is established between the combustion chamber 12 and a spiral smoke conducting passageway 58 between the spiral flange 46 of the outer cylinder 38 and the inner surface of the tubular shell 34. Under the force of suction exerted upon the bit 26, smoke is directed through the spiral passageway 58 to an aperture 60 extending through the wall of the outer cylinder 38 in alignment with an aperture 62 formed in the wall of the intermediate cylinder 40.

Smoke is thus directed from the spiral passageway 58 to an annular passageway 64 between the intermediate cylinder 40 and the internal cylinder 42 and is directed backwardly toward the bowl 10 of the pipe. Aperture 66 extending through the inner cylinder 42 is provided to interconnect the annular passageway 64 with the bore 44 in the inner cylinder 42 communicating with the space within the bit 26.

Means may be provided to admit air for supporting combustion within the combustion chamber 12 at a point adjacent the bit 26 of the pipe. One desirable form of such air inlet means comprises a rotatable ring 68 yieldingly maintained in any predetermined position by a spring 70 secured to the intermediate cylinder 40 and exerting an outwardly directed restraining force on the inner surface of the ring 68. The ring 68 has radial apertures 72 communicating with axially extending slots 74 leading to an annular air supply chamber 76 between the outer cylinder 38 and the intermediate cylinder 40. The annular air supply chamber 76 communicates by way of ports 78 with the space 20 between the bowl 10 and casing 14. The space 20 communicates with the space 22 between the bowl 10 and cover 16 whereupon air to support combustion is admitted to the combustion chamber 12.

It will thus be seen that the smoke passing through the spiral smoke conducting passageway 58 is cooled by atmospheric air on the outside of the tubular shell 34 and the air to support combustion flowing through the annular air supply chamber 76 between the outer cylinder 38 and the intermediate cylinder 40.

The air to support combustion in the combustion chamber 12 is heated as it flows through the stem 24 between the smoke conducting passages 58 and 64. This preheating of the combustion air maintains the bowl 10 at a more even temperature and condensation due to variation of temperature of air in the combustion chamber and on the outside takes place within the smoke conducting passages 58 and 64 of the stem 24 due to the reduction of the temperature of the smoke because of the absorption of heat therefrom to heat the air flowing to the combustion chamber 12 through the annular air supply chamber 76. Tar and other impurities are therefore not deposited in the bowl and the smoke is left cleaner than in pipes where the air enters the combustion chamber directly. Since the bowl 10 is protected by the casing 14, the pores through the bowl are not so apt to become clogged and stopped up, and the bowl is permitted to breathe more freely than in a pipe where the bowl is handled.

Since all of the air for supporting combustion is admitted through the stem and the combustion chamber 12 is closed by the cover 16, there is no danger of ashes blowing out of the combustion chamber, and the pipe can be readily smoked in high winds.

The inner cylinder 42 is provided with a pair of radially extending flanges 80 to form a saliva trap 82 within the space between the intermediate and inner cylinders 40 and 42 respectively. The saliva trap 82 communicates with the bore 44 within the inner cylinder 42 by way of ports 84. A saliva trap is thus formed within the stem of the pipe isolated from the path of smoke travel.

The inner cylinder 42 is also provided with a male threaded portion 86 adapted to engage the female threads of the portion 28 to maintain the parts in the assembled condition. The angular position of the bowl 10 relative to the bit 26 may be varied to suit the taste of individual smokers by adjusting the position of the collet 28 with reference to the bowl 10 and casing 14.

A guide pin 88 may be interposed between the bit 26 and the intermediate cylinder 40 to align the apertures 62 formed in the intermediate cylinder 40 with the inner cylinder 42 in such a manner that the port 66 interconnecting the annular chamber 64 with the bore 44 within the inner cylinder will be positioned on top and the apertures or ports 84 interconnecting the bore 44 within the inner cylinder and the saliva trap 82 will be positioned on the bottom. A suitable guide pin 90 preferably carried by the intermediate cylinder 40 may be provided to align the outer cylinder 38 to connect the aperture 60 formed therein with the aperture 62 formed in the intermediate cylinder 40.

The amount of air to support combustion may be varied as desired by rotating the ring 68 to vary the alignment between the radial apertures 72 with the slots 74.

Auxiliary air for diluting and further cooling the smoke may be admitted at any desired point in the path of smoke travel from the combustion chamber to the bit. One desirable auxiliary device admits diluting air adjacent the casing 14. A ring 92 having a radially extending aperture 94 extending therethrough is rotatably mounted on the outer shell 34 of the stem 24. The ring 92 may be rotated on the shell 34 to vary the alignment between the aperture 94 and radially extending cooperating aperture 96 through the shell 34 communicating with the spiralled smoke conducting passage 58. A spring 98 interposed between the ring 92 and the shell 34 may be provided to maintain the ring in any adjusted position.

The operation of this embodiment of the invention is as follows: Tobacco to be burned is placed in the combustion chamber 12 formed in the bowl 10 and the smoke passes through the ports 47 and 48 to the passageway 50. The smoke is then blocked off by the plug 52 and passes upwardly through the apertures 54 and 56 to the spiral smoke conducting passage 58 formed between the outer cylinder 38 and the inner surface of the tubular shell 34.

As the smoke approaches the bit 26 it passes through the aligned apertures 60 and 62 to the annular chamber 64 between the intermediate cylinder 40 and the inner cylinder 42 and is directed back toward the bowl 10 and is discharged from the annular chamber 64 through the aperture 66 into the space or bore 44 within the inner cylinder 42 communicating with the bit 26. Air for supporting combustion in the combustion chamber 12 passes through the apertures 72 and slots 74 to the annular passageway 76 interposed between the outer cylinder 38 and the intermediate cylinder 40. This combustion air is discharged through the ports 78 to the space 20 between the bowl 10 and the casing 14 and then passes to the space 22 between the bowl 10 and cover 16 and is drawn into the combustion chamber 12.

It will be noted that the intermediate cylinder 40 overlies the radial flanges 80 carried by the inner cylinder 42 to form the saliva trap 82 and also overlies the ends of plugs 52 positioned in the aperture through the inner cylinder to prevent the plug 52 from becoming disassembled from the inner cylinder 42 when the pipe is partially disassembled.

The embodiment of the invention illustrated in Fig. 4 is similar in many respects to that illustrated in Fig. 1. Corresponding parts have therefore been given corresponding reference numerals with the addition of 100.

The stem 124 is connected with the bowl 110 and casing 114 adjacent the bottom of the combustion chamber 112 to form a conventional pipe rather than being attached adjacent the top to form a so-called upside-down pipe as illustrated in Fig. 1.

The passageway 148 in the bowl 110 is aligned with a port through the portion 128 communicating preferably directly with the spiralled smoke conducting passage 158. Since in this embodiment of the invention the smoke passes directly into the smoke conducting passage 158 from the combustion chamber 112, it is unnecessary to block off the space within the inner cylinder 142 to direct the smoke into the spiralled smoke conducting passage.

It will also be observed that the inner cylinder 142 is provided with a radially fluted end portion 161 embedded into the bit 126 to securely maintain the bit in assembled relation with the inner cylinder 142.

The operation of this embodiment of the invention is as follows: Tobacco to be burned is placed in the combustion chamber 112 formed in the bowl 110, and the smoke passes through the ports 147 and 148 to the spiral smoke conducting passage 158 formed between the outer cylinder 138 and the inner surface of the tubular shell 134.

The smoke flows through the spiralled passage 158 and as it approaches the bit 126 it passes through the aligned apertures 160 and 162 to the annular chamber 164 between the intermediate cylinder 140 and the inner cylinder 142, and is directed back toward the bowl 110 and is discharged from the annular chamber 164 through th apertures 166 into the space or bore 144 within the inner cylinder 142 communicating with the bit 126.

Air for supporting combustion in the combustion chamber 112 passes through the slots 174 to the annular passage way 176 interposed between the outer cylinder 138 and the intermediate cylinder 140. This combustion air is discharged through the ports 178 to the space 120 between the bowl 110 and the casing 114, and then passes to the space 122 between the bowl 110 and the cover 116 and is drawn into the combustion chamber 112.

It will be noted that the intermediate cylinder 140 overlies the radial flanges 180 carried by the inner cylinder 142 to form the saliva trap 182 communicating with the space 144 within the inner cylinder 142 through the ports 184.

Auxiliary air for diluting and further cooling the smoke may be admitted through the aperture 194 to the spiral smoke conducting passage 158 adjacent the casing 114. The quantity of diluting air admitted may of course be varied by adjusting the position of the ring 192.

This is a continuation in part of my copending application Serial No. 349,265, filed August 1, 1940, now Patent No. 2,357,018, patented on August 29, 1944.

I claim:

1. A storm pipe comprising a bowl having a combustion chamber, a cover for the bowl, a bit, a stem comprising a plurality of concentric cylinders interposed between the bowl and bit, a spiral flange carried by one of said cylinders to form a spiral smoke conducting cooling passage, a radial flange carried by another of said cylinders adjacent the bowl to confine the smoke to a predetermined portion of the space between a plurality of said cylinders, connecting means between said last named space and the inner of said cylinders communicating with the bit, an air inlet passage between a plurality of said cylinders to admit air to the combustion chamber from a point adjacent the bit, and a saliva trap positioned between said radial flange and the bowl and formed between a pair of the concentric cylinders to isolate the saliva trap from the smoke passage and the air inlet passage through the stem, said spiral flange and radial flange cooperating to engage the inner walls of their associated cylinders when disassembled to exert a cleaning action thereon.

2. A smoking pipe comprising a bowl having a combustion chamber, a cover for the bowl, a bit, a plurality of concentrically disposed cylinders interposed between the top of the bowl and the bit to form a so-called upside down pipe, cooperating screw threaded connecting means between the bowl and one of said concentric cylinders, means adjacent the bowl to separate the space within the inner cylinder into two longitudinally spaced chambers, connecting means between the combustion chamber and a smoke conducting passage interposed between a plurality of said cylinders, a smoke conducting passage interposed between the inner of said cylinders and another of said concentric cylinders communicating with the first mentioned smoke conducting passage, a radial flange carried by the inner cylinder spaced toward the bit from said separating means to provide a saliva trap between said flange and separating means, and connecting means between said last named smoke conducting passage and the inner of said cylinders positioned toward the bit from said flange to isolate the smoke passage from said saliva trap.

3. A smoking pipe comprising a bowl having a combustion chamber, a casing surrounding the bowl, a cover for the bowl, a bit, a stem interposed between the bowl and bit and comprising a tubular shell and a plurality of concentrically disposed cylinders positioned in the shell, radial flanges carried by the outer of said cylinders cooperating with the inner surface of the tubular shell to form a spiral smoke-conducting passage, connecting means between the combustion chamber of the bowl and said spiral passage, connecting means adjacent the bit between said spiral smoke-conducting passage and an annular smoke-conducting passage between a plurality of said concentric cylinders, connecting means between said annular passage and the hollow of the inner cylinder communicating with the bit, said connecting means projecting through the upper portion of the inner cylinder when the pipe is in the normal smoking position, a radial flange carried by the inner cylinder to engage the wall of the intermediate cylinder, whereby the walls of the tubular shell and said intermediate cylinder will be cleaned as the pipe is disassembled, said flange being positioned adjacent the bowl and between the bowl and the last-named connecting means, air supply means for the bowl comprising an annular passage extending longitudinally of the stem to admit air to the combustion chamber from a point adjacent the bit, and a saliva trap radially between the inner cylinder and the next adjacent cylinder and longitudinally between the bowl and said radial flange and communicating with the hollow of the inner cylinder through a port projecting through the lower portion of the inner cylinder between said flange and the bowl whereby the saliva trap is isolated from the path of smoke travel and the air supply means through the pipe.

4. A smoking pipe comprising a bowl, a casing surrounding the bowl, a cover for the bowl, a chamber between the bowl and casing, a bit, a stem comprising a plurality of concentrically disposed cylinders interposed between the casing and bit, a plurality of concentrically disposed smoke conducting passages extending longitudinally of the stem, an air inlet chamber interposed between said plurality of concentrically disposed smoke-conducting passages, means to admit air to said air inlet chamber at a point adjacent the bit, connecting means between the air inlet chamber and the chamber between the bowl and casing, a saliva trap isolated from the air inlet chamber and interposed between a plurality of said cylinders and communicating with the bit by way of a port projecting through the lower wall of one of said cylinders when the pipe is held in the normal smoking position, and connecting means between the bit and one of said smoke-conducting passages comprising a port projecting through the upper wall of one of said cylinders when the pipe is in the normal smoking position, the last-named connecting means being spaced with reference to the saliva trap to isolate the path of smoke travel from the saliva trap.

5. A smoking pipe comprising a casing, a bowl having a combustion chamber positioned in the casing, a cover for the bowl, a collet clampingly engaged to said casing adjacent the upper portion of the casing to form a so-called upside-down pipe, air inlet and discharge openings extending through said collet, a threaded portion carried by the collet, a bit, a stem comprising a plurality of concentrically disposed cylinders interposed between the bowl and bit, a plurality of spaced smoke-conducting passages interposed between said cylinders, connecting means between one of said smoke-conducting passages and the bit, an air inlet passage between a plurality of said concentrically disposed cylinders to admit combustion air to the combustion chamber, a threaded portion carried by one of said cylinders beyond said connecting means to operably connect said stem to the threaded portion carried by the collet, means to divide one of said smoke-conducting passages longitudinally, and a saliva trap interposed between a plurality of the cylinders beyond said dividing means and communicating with the bit to provide a gravity feed when the pipe is in the normal smoking position to isolate the saliva trap from the path of smoke travel and the air inlet passage.

6. A storm pipe comprising a bowl having a combustion chamber, a casing surrounding the bowl, a cover for the bowl, a bit, a plurality of concentric cylinders interposed between the bowl and bit, a spiral flange carried by one of said cylinders to form a spiral smoke-conducting cooling passage, a radial flange carried by another of said cylinders adjacent the bowl to confine the smoke to a predetermined portion of the space between a plurality of said cylinders, a saliva trap positioned radially between a plurality of said cylinders and positioned longitudinally between the radial flange and the bowl, connecting means between said predetermined space portion and the upper portion of the inner of said cylinders communicating with the bit, connecting means between the lower portion of the inner cylinder and the saliva trap to isolate the saliva trap from the smoke passage, and an air inlet passage between a plurality of said cylinders and isolated from the saliva trap to admit air to the combustion chamber from a point adjacent the bit, said spiral flange and radial flange cooperating to engage the inner walls of their associated cylinders when disassembled to exert a cleaning action thereon.

7. A smoking pipe comprising a casing, a bowl having a combustion chamber positioned in the casing, a cover for the bowl, a collet clampingly engaged to said casing adjacent the lower portion of the casing, air inlet and discharge openings extending through said collet, a threaded portion carried by the collet, a bit, a stem comprising a plurality of concentrically disposed cylinders interposed between the bowl and bit, a plurality of spaced smoke conducting passages interposed between said cylinders, connecting means between one of said smoke conducting passages and the bit, an air inlet passage between a plurality of said concentrically disposed cylinders to admit combustion air to the combustion chamber, a threaded portion carried by one of said cylinders beyond said connecting means to operably connect said stem to the threaded portion carried by the collet, and a saliva trap positioned between a plurality of said concentrically disposed cylinders and interposed between said threaded portion and the last named connecting means and so related to the smoke conducting passages as to be isolated therefrom and from the air inlet passage to prevent contamination of the smoke.

RAYMOND J. MILLER.

REFERENCES CITED

The following references are of record in the file of this patent:

UNITED STATES PATENTS

| Number | Name | Date |
|---|---|---|
| 341,150 | Kuestner | May 4, 1886 |
| 924,508 | Talarico | June 8, 1909 |
| 1,043,869 | Ranson | Nov. 12, 1912 |
| 1,403,527 | Villaume | Jan. 17, 1922 |
| 1,656,787 | Grenier | Jan. 17, 1928 |
| 1,671,899 | Hilshansky | May 29, 1928 |
| 2,243,091 | Eguchi | May 27, 1941 |

FOREIGN PATENTS

| Number | Country | Date |
|---|---|---|
| 99,691 | Australia | Apr. 10, 1925 |
| 14,964 | Denmark | Aug. 14, 1911 |
| 5,612 | Great Britain | 1894 |
| 29,965 | Germany | Dec. 20, 1884 |